(12) United States Patent
Huang et al.

(10) Patent No.: US 9,893,793 B2
(45) Date of Patent: Feb. 13, 2018

(54) MULTI-ANTENNA SYSTEM

(71) Applicant: MediaTek Inc., Hsin-Chu (TW)

(72) Inventors: Shao-Yu Huang, Zhubei (TW);
Chung-Yu Hung, Taipei (TW);
Shih-Huang Yeh, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/184,616

(22) Filed: Jun. 16, 2016

(65) Prior Publication Data
US 2017/0026103 A1    Jan. 26, 2017

Related U.S. Application Data

(60) Provisional application No. 62/194,358, filed on Jul. 20, 2015.

(51) Int. Cl.
| H04B 1/18 | (2006.01) |
| H04B 7/08 | (2006.01) |
| H01Q 21/30 | (2006.01) |
| H01Q 5/50 | (2015.01) |
| H04B 1/00 | (2006.01) |

(52) U.S. Cl.
CPC .......... *H04B 7/08* (2013.01); *H01Q 5/50* (2015.01); *H01Q 21/30* (2013.01); *H04B 1/0064* (2013.01)

(58) Field of Classification Search
CPC ........ H04B 7/08; H04B 7/0891; H01Q 1/243; H01Q 121/28
USPC ..... 455/188.1, 180.1, 176.1, 168.1; 343/745, 343/893
See application file for complete search history.

(56) References Cited

U.S. PATENT DOCUMENTS

| 6,298,243 | B1 |  | 10/2001 | Basile | |
| 8,774,067 | B2 | * | 7/2014 | Rousu | H01Q 1/242 |
| | | | | | 333/126 |
| 9,190,699 | B2 | * | 11/2015 | Granger-Jones | H01P 1/15 |
| 9,257,750 | B2 | * | 2/2016 | Vazquez | H01Q 9/42 |
| 2010/0109967 | A1 |  | 5/2010 | Ranta | |
| 2011/0065383 | A1 |  | 3/2011 | Frankland et al. | |
| 2013/0241800 | A1 | * | 9/2013 | Schlub | H01Q 1/243 |
| | | | | | 343/893 |
| 2014/0313087 | A1 | * | 10/2014 | Jiang | H01Q 3/22 |
| | | | | | 343/745 |

FOREIGN PATENT DOCUMENTS

| JP | 2003324314 A | 11/2003 |
| JP | 2007312230 A | 11/2007 |
| JP | 201140811 A | 2/2011 |

* cited by examiner

*Primary Examiner* — Sonny Trinh
(74) *Attorney, Agent, or Firm* — McClure, Qualey & Rodack, LLP

(57) ABSTRACT

A multi-antenna system is provided. The multi-antenna system includes a first antenna, a second antenna, a tunable circuit, and a frequency-divisional circuit. The first antenna is utilized to implement signals of a first frequency band. The second antenna is utilized to implement signals of a second frequency band. The second antenna is different from the first antenna, and frequencies of the second frequency band are greater than frequencies of the first frequency band. The tunable circuit is utilized to switch the signals of the first frequency band. The frequency-divisional circuit is utilized to suppress harmonics caused by the tunable circuit.

20 Claims, 10 Drawing Sheets

MULTI-ANTENNA SYSTEM

CROSS REFERENCE TO RELATED APPLICATIONS

This application claims the benefit of U.S. Provisional Application No. 62/194,358, filed on Jul. 20, 2015, the entirety of which is incorporated by reference herein.

BACKGROUND OF THE DISCLOSURE

Field of the Disclosure

The present inventive concept relates to a multi-antenna system. More particularly, the inventive concept relates to a multi-antenna system for suppressing harmonics.

Description of the Related Art 4G, or Long Term Evolution (LTE), wireless communication standard and carrier aggregation (CA) technologies are widely adopted in various kinds of electronic devices. CA technology features the ability to operate on multiple frequency bands simultaneously, such as receiving low-frequency signals and high-frequency signals at the same time. However, the aggregation of the signals in different frequencies results in harmonic desensitization, and the performance of the LTE standard complied antenna system will be deteriorated due to this harmonic desensitization.

In addition, non-linear electronic components are often configured in the antenna system to improve the deficiency of bandwidth. However, the non-linear electronic components cause harmonic desensitization of the LTE wireless communication standard system even worse. Therefore, a multi-antenna system is needed for suppressing harmonics and preventing the LTE wireless communication standard system from deterioration caused by the harmonics.

BRIEF SUMMARY OF THE DISCLOSURE

In one aspect of the disclosure, a multi-antenna system is provided. The multi-antenna system includes a first antenna, a second antenna, a tunable circuit and a frequency-divisional circuit. The first antenna is utilized to implement signals of a first frequency band. The second antenna is utilized to implement signals of a second frequency band. The second antenna is different from the first antenna, and frequencies of the second frequency band are greater than frequencies of the first frequency band. The tunable circuit is utilized to switch the signals of the first frequency band and/or the second frequency band. The frequency-divisional circuit is utilized to suppress harmonics caused by the tunable circuit.

The tunable circuit and the frequency-divisional circuit are arranged between the first antenna and the second antenna, and the tunable circuit and the frequency-divisional circuit are connected in series with the first antenna and the second antenna. The tunable circuit is arranged between the first antenna and the frequency-divisional circuit. In another implementation, the frequency-divisional circuit is utilized to receive an external signal and divide the external signal into the signals of the first frequency band and the second frequency band. The frequency-divisional circuit is connected to a feeding point for receiving the external signal. Furthermore, the tunable circuit includes at least one passive electronic device to match the impedance of the first antenna. The tunable circuit comprises a switch, a tuner, a varactor and/or a diode, and the frequency-divisional circuit comprises a diplexer, a low-pass filter, a high-pass filter and/or a band-pass filter. In addition, the frequency-divisional circuit is incorporated with a front end component.

In another aspect of the disclosure, a multi-antenna system is provided. The multi-antenna system provides at least one frequency-divisional circuit, at least two antennas and at least one tunable circuit. The frequency-divisional circuit is utilized to receive an external signal and divide the external signal into signals of different frequency bands. The antennas are utilized to respectively implement signals of the frequency bands. At least one tunable circuit is arranged between at least one of the frequency-divisional circuits and at least one of the antennas, and it is utilized to switch the signals of at least one of the frequency bands. Harmonic caused by the tunable circuit is suppressed by the frequency-divisional circuit and the antennas. In one implementation, a portion of the at least two antennas is directly connected to a portion of the frequency-divisional circuits. In another implementation, at least one frequency-divisional circuit is connected to a feeding point for receiving the external signal, and a portion of the at least two antennas is directly connected to a portion of the frequency-divisional circuits. Furthermore, a portion of the at least one tunable circuit is arranged between the feeding point and a portion of the at least two antennas.

A detailed description is given in the following implementations with reference to the accompanying drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

Corresponding numerals and symbols in the different figures generally refer to corresponding parts unless otherwise indicated. The figures are drawn to clearly illustrate the relevant aspects of the implementations and are not necessarily drawn to scale.

DETAILED DESCRIPTION OF THE DISCLOSURE

The following description is of the best-contemplated operation of carrying out the disclosure. This description is made for the purpose of illustrating the general principles of the disclosure and should not be taken in a limiting sense. Certain terms and figures are used throughout the description and following claims to refer to particular components. As one skilled in the art will appreciate, manufacturers may refer to a component by different names. This document does not intend to distinguish between components that differ in name but not function. The terms "component", "system" and "device" used in the present disclosure could be the entity relating to the computer which is hardware, software, or a combination of hardware and software. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
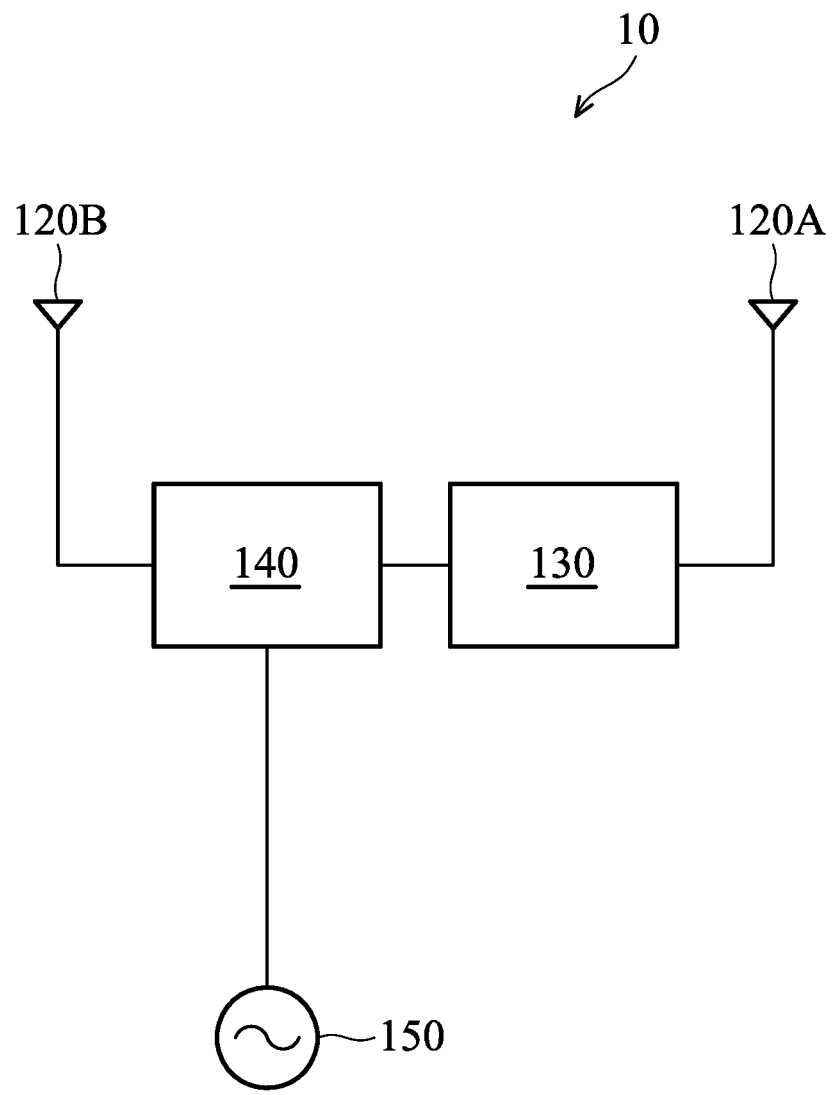
FIG. 1 is a schematic diagram of a multi-antenna system according to the present disclosure.

FIG. 1 is a schematic diagram of a multi-antenna system 10 according to the present disclosure. The multi-antenna system 10 could be included in an electronic device such as cell phone, a tablet computer, a laptop computer, a desktop computer or a server. The multi-antenna system 10 includes two antennas 120A and 120B, a tunable circuit 130, a frequency-divisional circuit 140 and a feeding point 150. As shown in FIG. 1, the tunable circuit 130 and the frequency-divisional circuit 140 are arranged between the antenna 120A and antenna 120B. The tunable circuit 130 is arranged between the antenna 120A and the frequency-divisional circuit 140. The frequency-divisional circuit 140 is connected to the feeding point 150. Furthermore, the tunable circuit 130 and the frequency-divisional circuit 140 are connected in series with the two antennas 120A and 120B.

The antenna 120A (first antenna) is utilized to implement signals of a first frequency band, and the antenna 120B (second antenna) is utilized to implement signals of a second frequency band. The antenna 120B is different from the antenna 120A, and frequencies of the second frequency band are greater than frequencies of the first frequency band. The first frequency band belongs to low frequencies such as 700 MHz to 960 MHz. The second frequency band belongs to high frequencies such as 1.7 GHz to 2.2 GHz. Accordingly, the multi-antenna system 10 could be utilized to perform the CA technology and to operate signal of multiple frequency bands simultaneously.

In one implementation, the tunable circuit 130 is utilized to switch the signals of the first frequency band and/or the second frequency band. For example, the first frequency band includes frequencies of 700 MHz to 960 MHz, and it could be divided into several sub-frequency bands. Signals of the sub-frequencies bands could be switched and selected by the tunable circuit 130. When the tunable circuit 130 switches and one of the sub-frequencies bands is selected, signals of the switched sub-frequency band could be combined with the signals of the second frequency band to perform the CA. In other words, the signals of the second frequency band are fixed, and the signals of the first frequency band could be switched and selected to perform various combination of CA. Specifically, the tunable circuit 130 could include a switch, a tuner, a varactor and/or a diode.

In another implementation, the frequency-divisional circuit 140 is connected to a feeding point 150 for receiving the external signal. The frequency-divisional circuit 140 is utilized to receive the external signal and divide the external signal into the signals of the first frequency band and signals of the second frequency band. Specifically, the frequency of the divided signals of the second frequency band could be two or three times of the frequency of the divided signals of the first frequency band. For example, the frequency-divisional circuit 140 divides the external signal into a signal of 900 MHz which belongs to the first frequency band and another signal of 1800 MHz which belongs to the second frequency band.

However, harmonics will be received when the signals of the first frequency band and signals of the second frequency band are aggregated. Furthermore, the tunable circuit 130 also causes harmonic desensitization when it processes signals of the first frequency band and the second frequency band. The frequency-divisional circuit 140 could be utilized to suppress harmonics caused by the tunable circuit 130 and the aggregation of signals. The frequency-divisional circuit 140 could include a diplexer, a low-pass filter, a high-pass filter and/or a band-pass filter. The configuration of the frequency-divisional circuit 140 could be determined by the frequency of the harmonics. Accordingly, the harmonics could be filtered out by the frequency-divisional circuit 140. For example, when the harmonics are in high frequency, the low-pass filter could be included by the frequency-divisional circuit 140 to filter out and eliminate the high-frequency harmonic. In another implementation, the frequency-divisional circuit 140 is incorporated with a front end component. In other words, the frequency-divisional circuit 140 could be implemented by the switch component in the front end.

As shown in FIG. 1, the frequency-divisional circuit 140 receives the external signal from the feeding point 150 and divides the external signal into the low-frequency signals and high-frequency signals. The low-frequency signals will be received by the antenna 120A, and the high-frequency signals will be received by the antenna 120B. In one implementation, the tunable circuit 130 is arranged between the antenna 120A and the frequency-divisional circuit 140. In other words, the tunable circuit 130 is arranged on the path of the low-frequency signals for switching. Since the frequency-divisional circuit 140 is directly coupled to the tunable circuit 130, the harmonics caused by the tunable circuit 130 could be suppressed by the frequency-divisional circuit 140.

In addition, the frequency gap of the first frequency band and the second frequency band is large enough such that the antennas 120A and 120B could be isolated and will not disturb each other. Because of the isolation between the antennas 120A and 120B, the harmonic desensitization could be suppressed.

Figure 2:
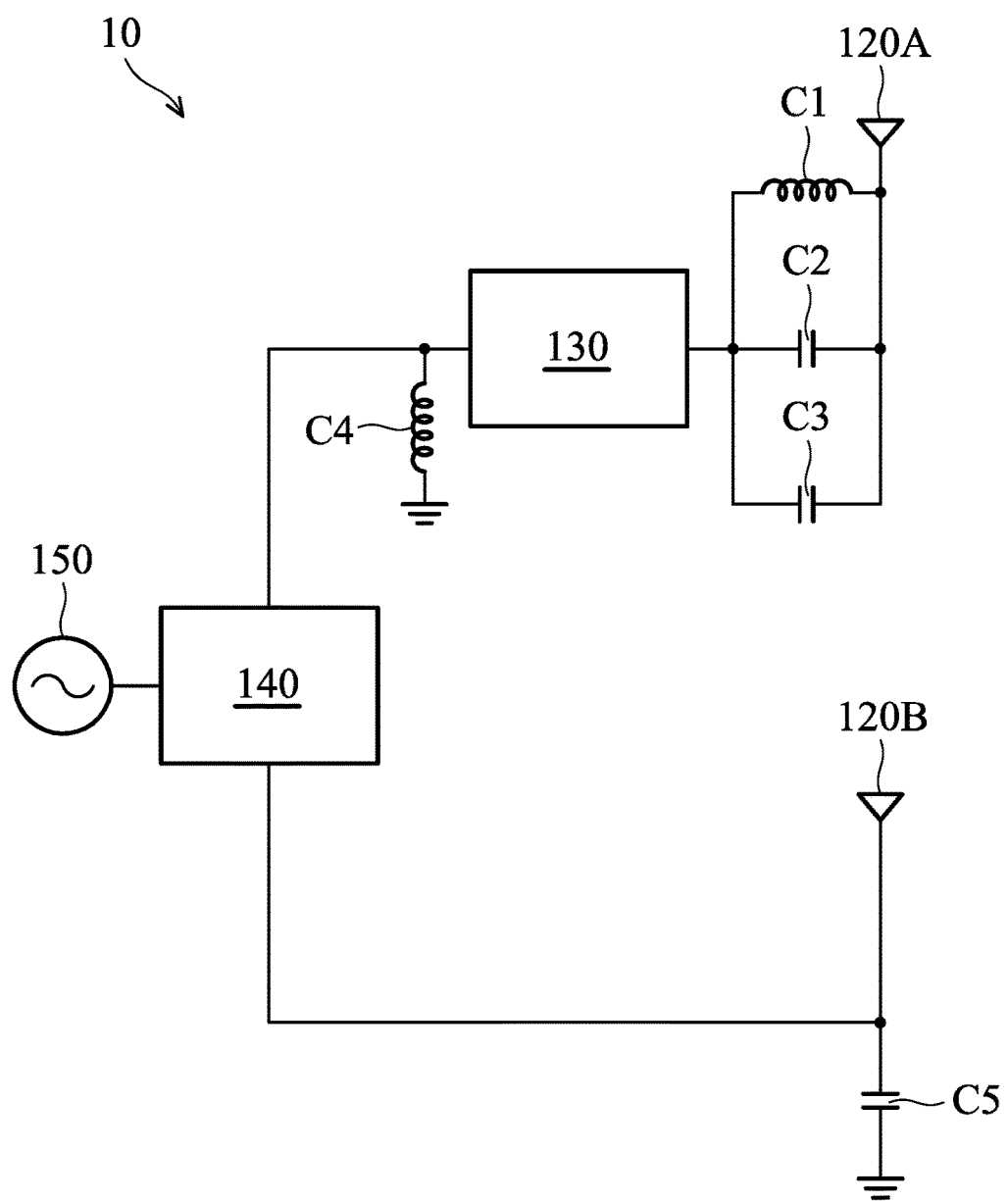
FIG. 2 another schematic diagram of a multi-antenna system according to the present disclosure.

FIG. 2 shows part of schematic diagram of a multi-antenna system 10 according to the present disclosure. The tunable circuit 130 connects to at least one passive electronic device to match the impedance of the antenna 120A. The passive electronic device could be a resistor, an inductor, or a capacitor. As shown in FIG. 2, three passive electronic components C1~C3 are connected in parallel and are arranged between the antenna 120A and the tunable circuit 130. In addition, a passive electronic component C4 is connected to the ground and arranged between the tunable circuit 130 and the frequency-divisional circuit 140. The passive electronic component C5 is connected to the ground and arranged between the antenna 120B and the frequency-divisional circuit 140. The coefficients, number, and the arrangements of the passive electronic components C1~C5 could be adjusted in order to match the impedance of the antenna 120A and/or the antenna 120B and adapt to various antenna system design. FIG. 2 demonstrates general impedance matching circuit in antenna design, it should be noted that the arrangement of the passive electronic components of FIG. 2 is for illustration, not for limitation. In the following description, when not specifically mentioned, direct connection between antennas and frequency-divisional circuits could be implemented by additional impedance matching circuits.

Figure 3A:
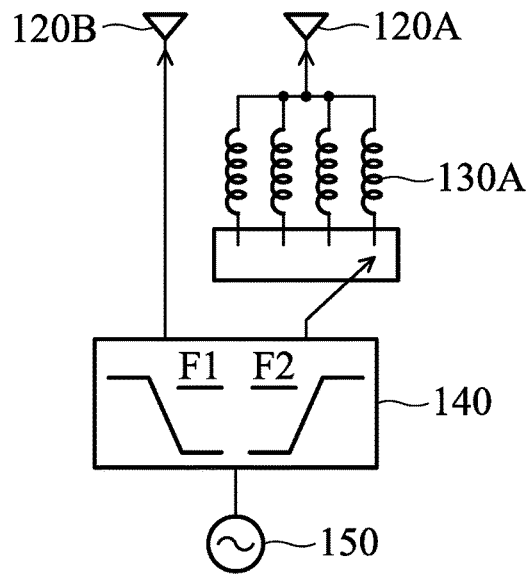
FIG. 3A to FIG. 3C are schematic diagrams of various implementations of the multi-antenna system according to the present disclosure.
Figure 3B:
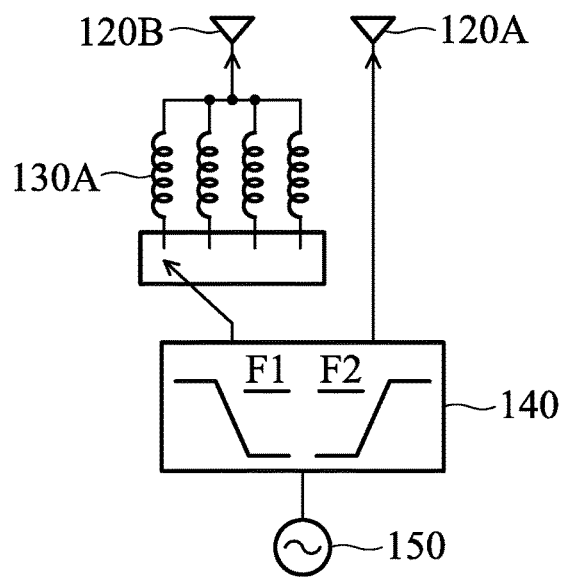
Figure 3C:
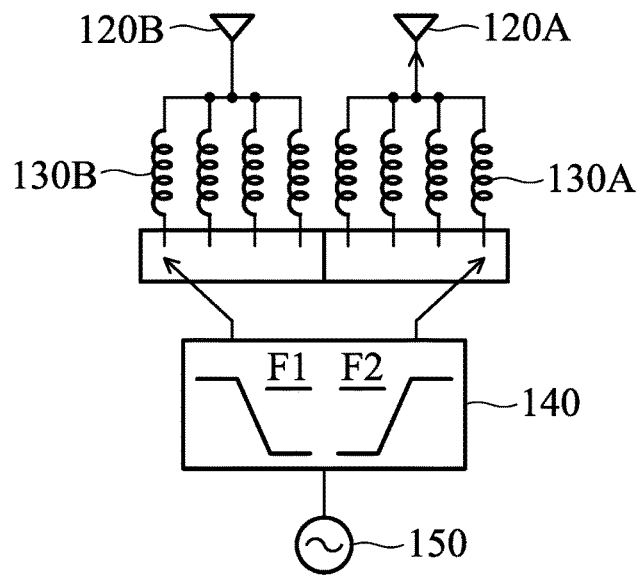

FIG. 3A to FIG. 3C are schematic diagrams of various implementations of the multi-antenna system 10 according to the present disclosure. The multi-antenna system 10 includes at least two antennas 120A and 120B, at least one tunable circuit 130A, at least one frequency-divisional circuit 140 and a feeding point 150. The frequency-divisional circuit 140 receives an external signal and divides the external signal into signals of different frequency bands. Specifically, the frequency-divisional circuit 140 could include a low-pass filter F1 and a high-pass filter F2. The amount and type of filters of the frequency-divisional circuit 140 are for illustration rather than limitation. The antennas 120A and 120B are isolated and are utilized to respectively implement signals of different frequency bands. The tunable circuit 130 is arranged between the frequency-divisional circuit 140 and the antenna 120A and/or 120B, and it is utilized to switch the frequency bands of the signals. By utilizing the multi-antenna system 10, harmonic caused by the tunable circuit 130A and the CA technology could be suppressed by the frequency-divisional circuit 140 and the isolated antennas 120A and 120B.

In the implementation of FIG. 3A, the antenna 120B is directly connected to the frequency-divisional circuit 140, and the antenna 120A is connected to the frequency-divisional circuit 140 through the tunable circuit 130A. Furthermore, the frequency-divisional circuit 140 is connected to the feeding point 150 for receiving the external signal. In the implementation of FIG. 3B, the antenna 120A is directly connected to the frequency-divisional circuit 140, and the antenna 120B is connected to the frequency-divisional circuit 140 through the tunable circuit 130A. In the implementation of FIG. 3C, the antenna 120A is connected to the frequency-divisional circuit 140 through the tunable circuit 130A, and the antenna 120B is connected to the frequency-divisional circuit 140 through the tunable circuit 130B.

Figure 4A:
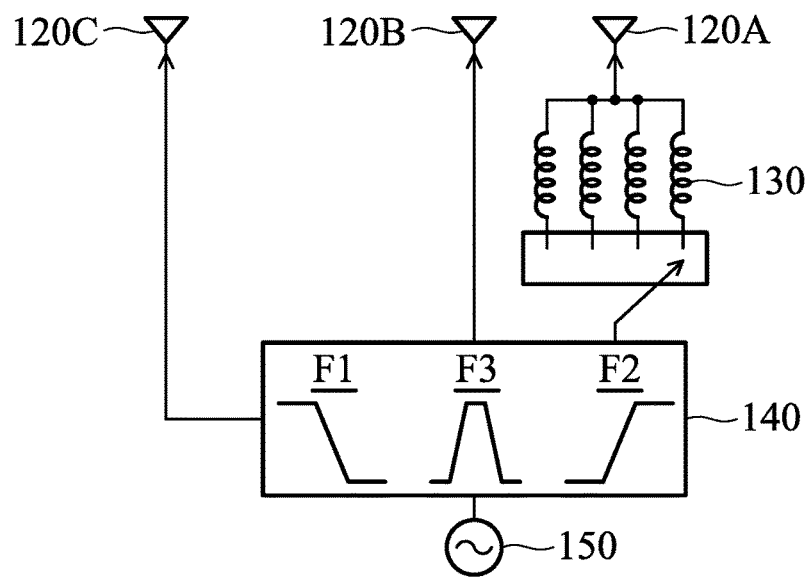
FIG. 4A to FIG. 4K are schematic diagrams of various implementations of the multi-antenna system according to the present disclosure.
Figure 4B:
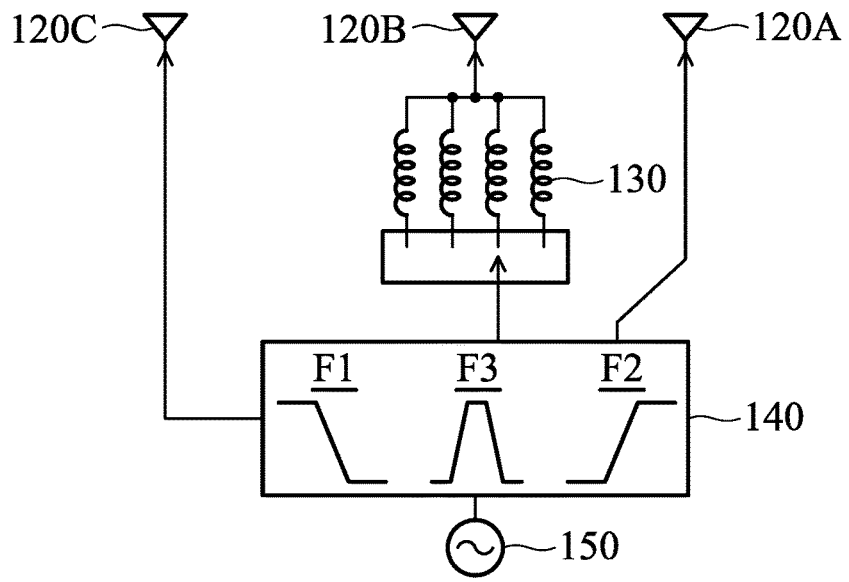
Figure 4C:
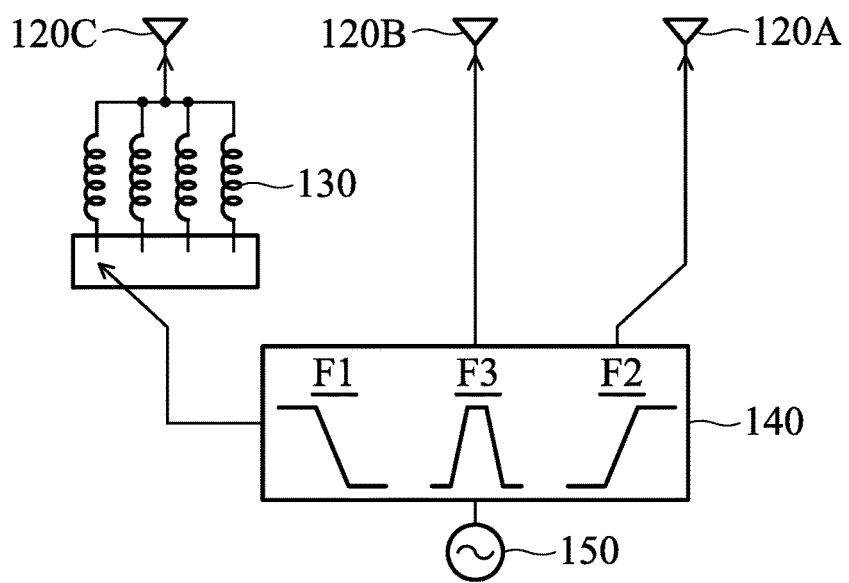

FIG. 4A to FIG. 4K are schematic diagrams of various implementations of the multi-antenna system 10 according to the present disclosure. In the implementations of FIG. 4A to FIG. 4K, three antennas 120A-120C are arranged for the multi-antenna system 10. In addition, the frequency-divisional circuit 140 could be implemented by various kinds of configurations. For example, the frequency-divisional circuit 140 includes a low-pass filter F1, a high-pass filter F2 and/or a band-pass filter F3. As shown in FIG. 4A, the antenna 120A is connected to the frequency-divisional circuit 140 through the tunable circuit 130, and the antennas 120B and 120C are directly connected to the frequency-divisional circuit 140. In the implementation of FIG. 4B, the antenna 120B is connected to the frequency-divisional circuit 140 through the tunable circuit 130, the antenna 120A and the antenna 120C are directly connected to the frequency-divisional circuit 140. In the implementation of FIG. 4C, the antenna 120C is connected to the frequency-divisional circuit 140 through the tunable circuit 130, and both the antennas 120A and 120B are directly connected to the frequency-divisional circuit 140.

Figure 4D:
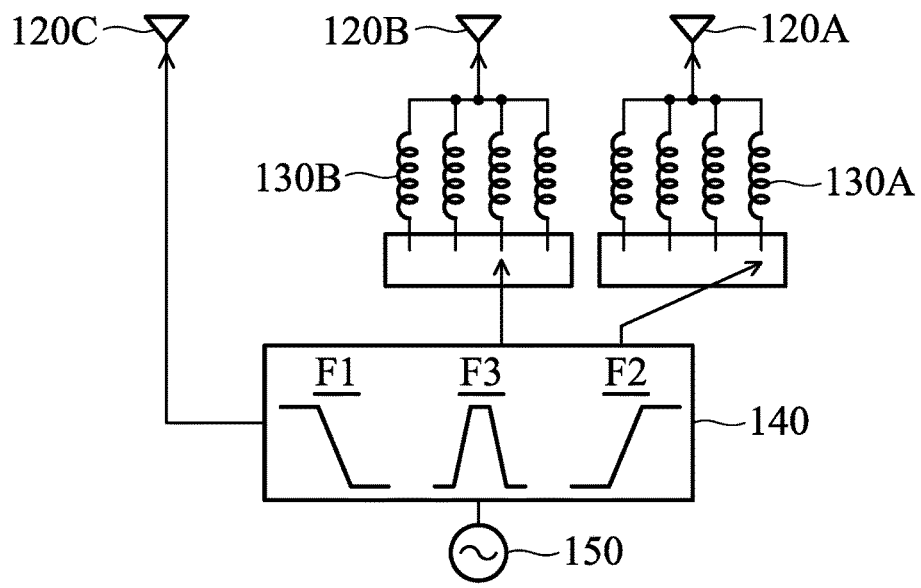

In the implementations of FIG. 4D to FIG. 4G, a plurality of tunable circuits 130A, 130B and 130C are arranged for the multi-antenna system 10. The frequency-divisional circuit 140 includes three filters F1, F2, and F3. As shown in FIG. 4D, the antenna 120A is connected to the frequency-divisional circuit 140 through the tunable circuit 130A, the antenna 120B is connected to the frequency-divisional circuit 140 through the tunable circuit 130B, and the antenna 120C is directly connected to the frequency-divisional circuit 140. Furthermore, the antenna 120A is utilized to implement signals of low frequency band, and antenna 120B is utilized to implement signals of middle frequency band, and the antenna 120C is utilized to implement signals of high frequency band.

Figure 4E:
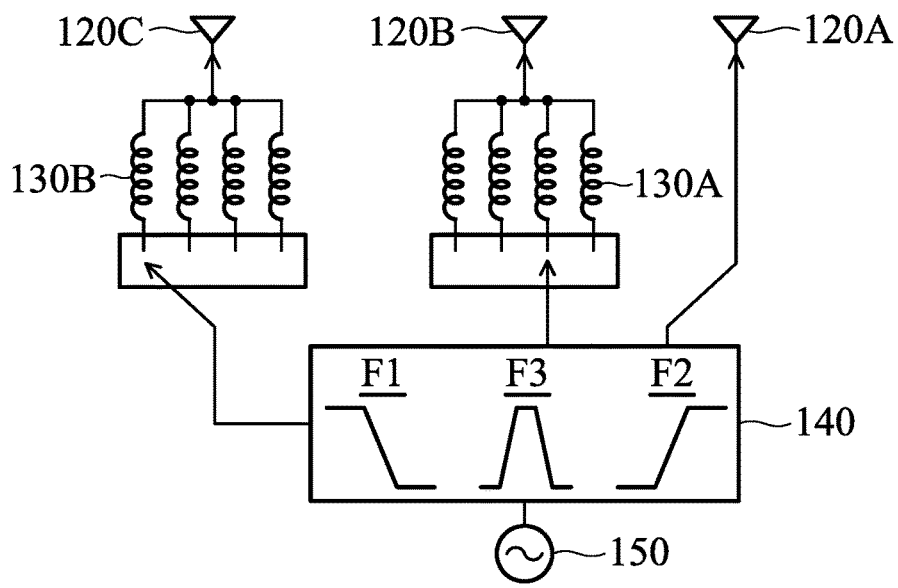
Figure 4F:
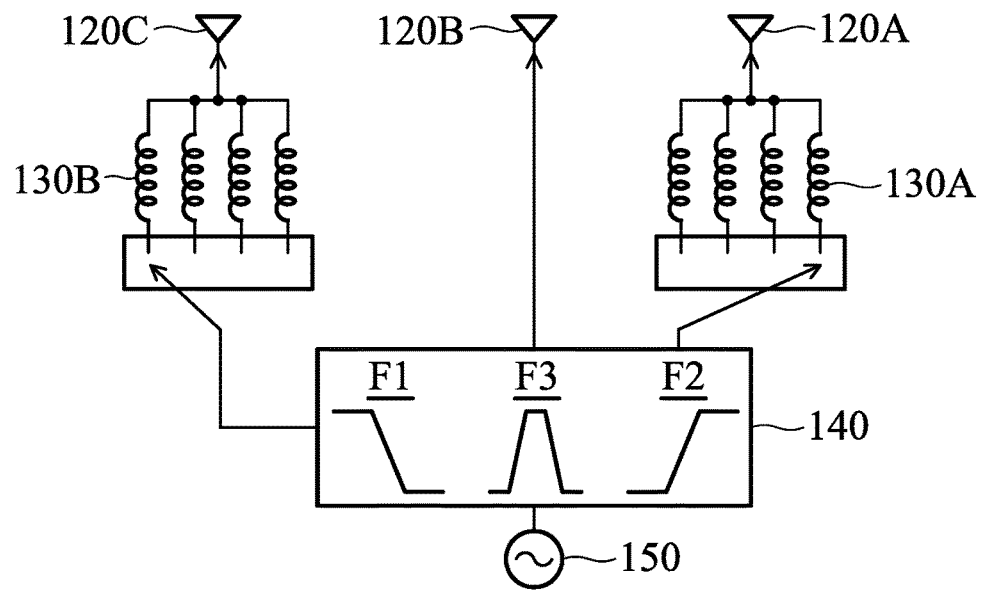
Figure 4G:
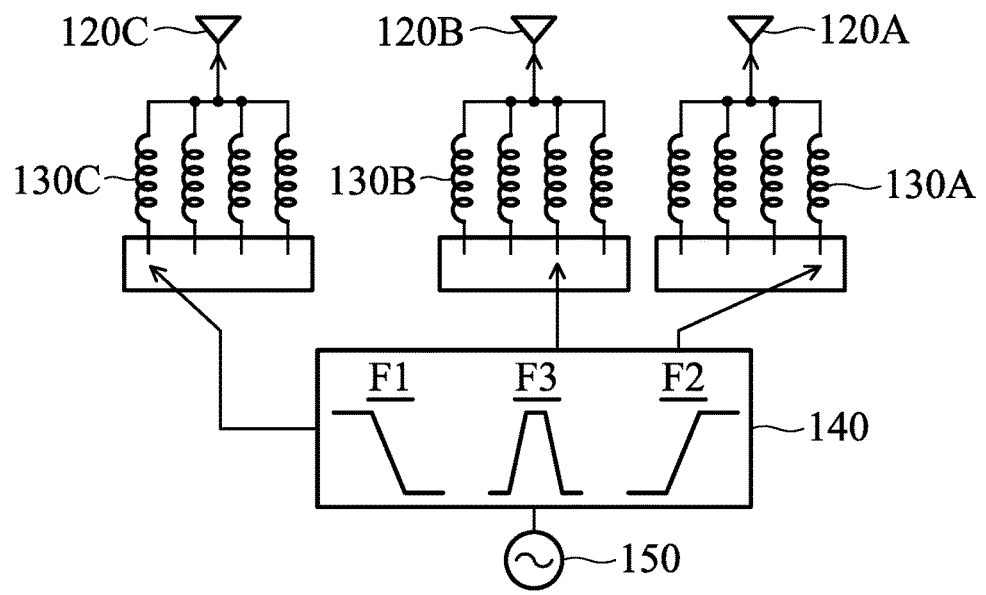

Furthermore, in the implementation of FIG. 4E, the antenna 120B is connected to the frequency-divisional circuit 140 through the tunable circuit 130A, the antenna 120C is connected to the frequency-divisional circuit 140 through the tunable circuit 130B, and the antenna 120A is directly connected to the frequency-divisional circuit 140. In the implementation of FIG. 4F, the antenna 120A is connected to the frequency-divisional circuit 140 through the tunable circuit 130A, the antenna 120C is connected to the frequency-divisional circuit 140 through the tunable circuit 130B, and the antenna 120B is directly connected to the frequency-divisional circuit 140. Furthermore, in the implementation of FIG. 4G, the antenna 120A is connected to the frequency-divisional circuit 140 through the tunable circuit 130A, the antenna 120B is connected to the frequency-divisional circuit 140 through the tunable circuit 130B, and the antenna 120C is connected to the frequency-divisional circuit 140 through the tunable circuit 130C.

Figure 4H:
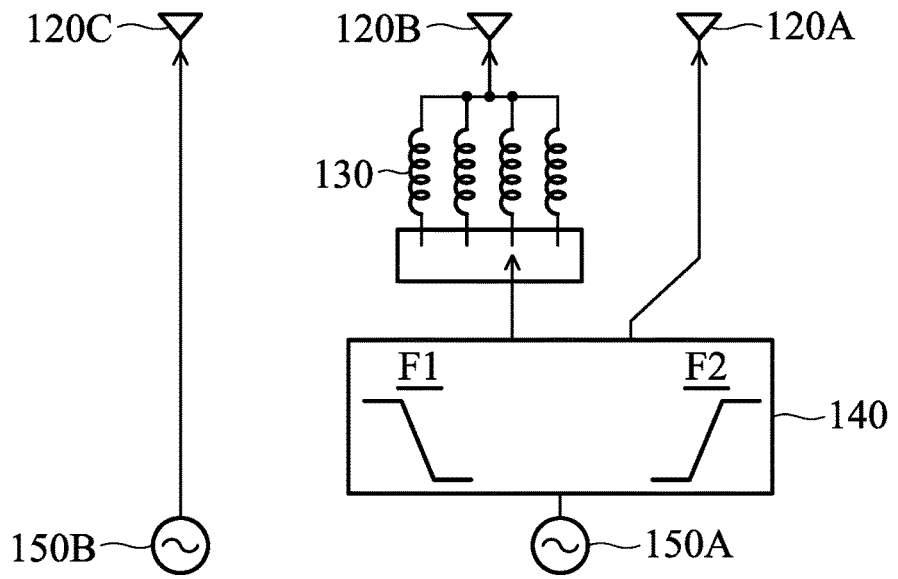
Figure 4I:
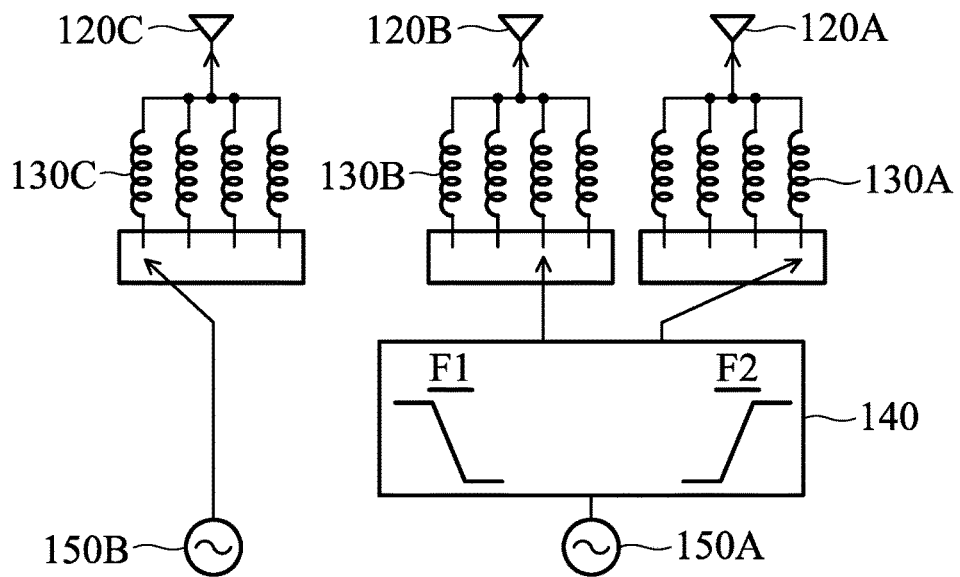

In one implementation, at least one of the antennas of the multi-antenna system 10 could be directly connected to the feeding point 150. As shown in FIG. 4H to FIG. 4K, two feeding points 150A and 150B are arranged. In the implementation of FIG. 4H, the antenna 120A is connected to the frequency-divisional circuit 140, the antenna 120B is connected to the frequency-divisional circuit 140 through the tunable circuit 130, and the antenna 120C is directly connected to the feeding point 150B. In the implementation of FIG. 4I, the antenna 120A is connected to the frequency-divisional circuit 140 through the tunable circuit 130A, the antenna 120B is connected to the frequency-divisional circuit 140 through the tunable circuit 130B, and the antenna 120C is connected to the feeding point 150B through the tunable circuit 130C. In other words, the tunable circuit 130C is arranged between the feeding point 150B and the antenna 120C.

Figure 4J:
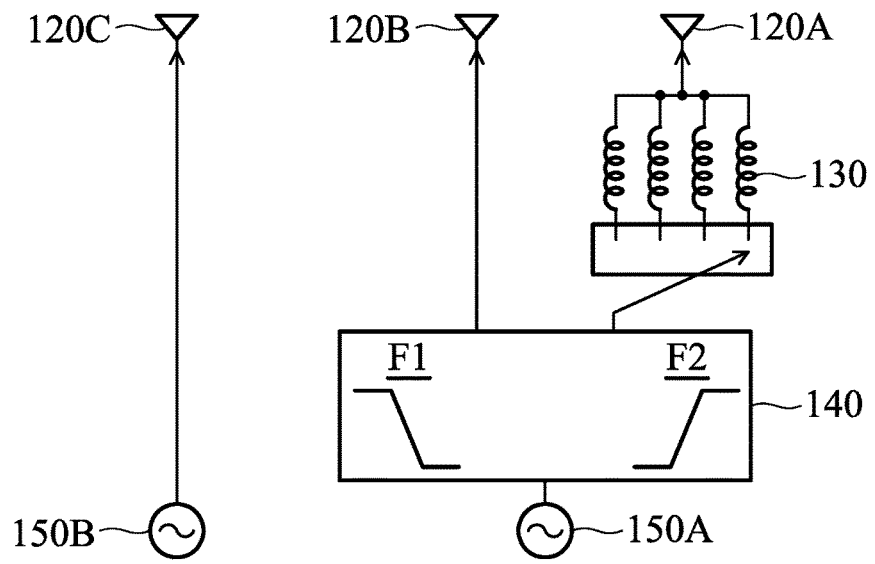
Figure 4K:
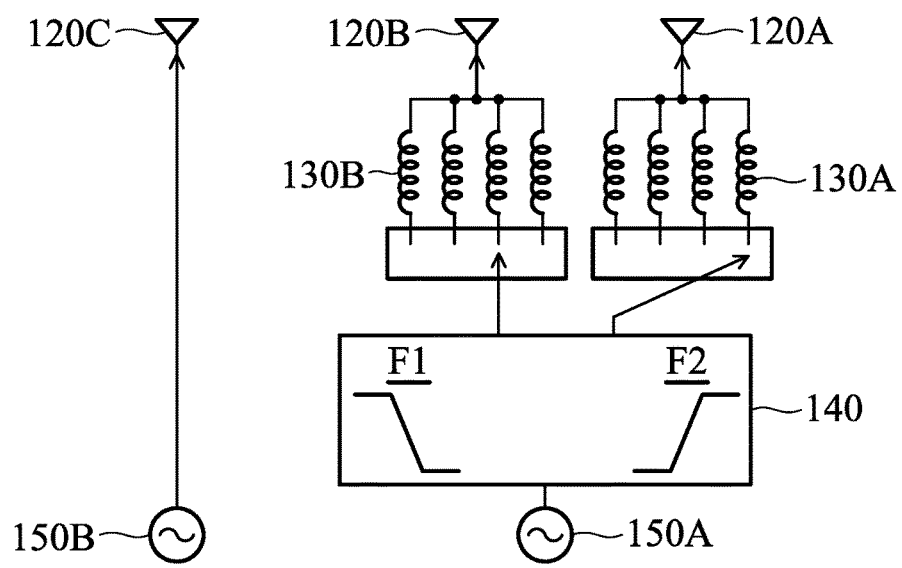

In addition, as shown in FIG. 4J, the antenna 120A is connected to the frequency-divisional circuit 140 through the tunable circuit 130, the antenna 120B is directly connected to the frequency-divisional circuit 140, and the antenna 120C is directly connected to the feeding point 150B. In the implementation of FIG. 4K, the antenna 120A is connected to the frequency-divisional circuit 140 through the tunable circuit 130A, the antenna 120B is connected to the frequency-divisional circuit 140 through the tunable circuit 130B, and the antenna 120C is directly connected to the feeding point 150B. In some implementations, the feeding point 150A could be combined with the feeding point 150B. It should be noted that various combinations of the antennas, tunable circuits and frequency-divisional circuits could be determined according to the design of the multi-antenna system 10 to effectively suppress the harmonic.

Figure 5:
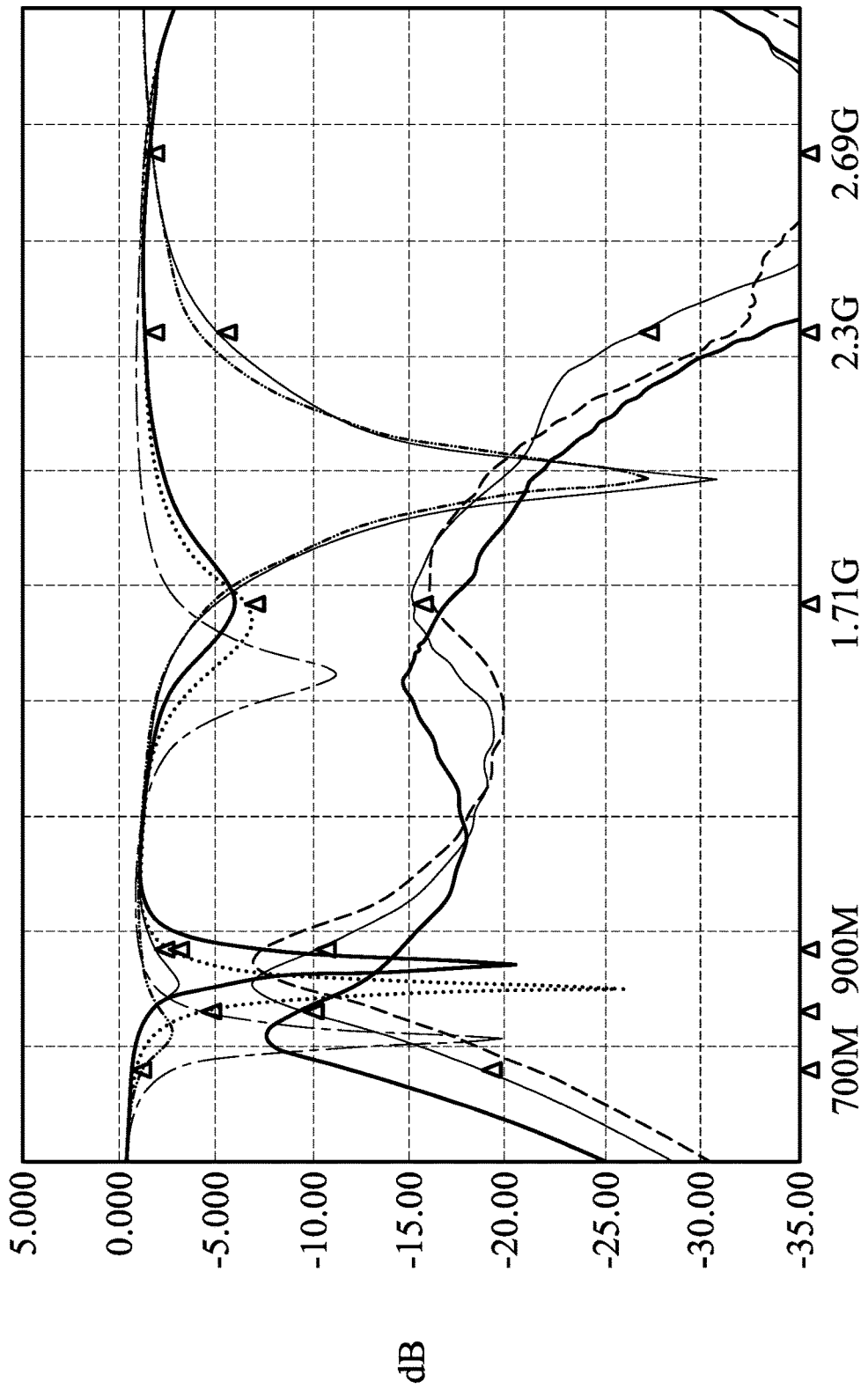
FIG. 5 is a schematic diagram illustrating performance of the multi-antenna system according to the present disclosure.

FIG. 5 is a schematic diagram illustrating performance of the multi-antenna system 10 according to the present disclosure. The first frequency band is on the frequencies of about 700 MHz to 900 MHz, and the second frequency band is on the frequencies of about 1.71 GHz to 2.2 GHz. The isolation of the antenna 120B is greater than 15 dB, and the harmonic desensitization is less than 0.3 dB. Since the multi-antenna system 10 is featured by isolated antennas and the frequency-divisional circuit 140 to suppress harmonics, therefore, the harmonic desensitization is effectively decreased by utilizing the multi-antenna system 10 of the present disclosure.

Although implementations of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding implementations described herein may be utilized according to the present disclosure. Accordingly, the appended claims are intended to include within their scope such processes, machines, manufacture, compositions of matter, means, methods, or steps. In addition, each claim constitutes a separate implementation, and the combination of various claims and implementations are within the scope of the disclosure.

What is claimed is:

1. A multi-antenna system:
   a first antenna, utilized to implement signals of a first frequency band;
   a second antenna, utilized to implement signals of a second frequency band, wherein the frequencies of the second frequency band are greater than frequencies of the first frequency band;
   a tunable circuit, utilized to switch the signals of the first frequency band and/or the second frequency band; and
   a frequency-divisional circuit, utilized to suppress harmonics caused by the tunable circuit.

2. The multi-antenna system as claimed in claim 1, wherein direct connection between the frequency-divisional circuits and the first antenna or the second antenna could be implemented by additional impedance matching circuits.

3. The multi-antenna system as claimed in claim 1, wherein the tunable circuit and the frequency-divisional circuit are arranged between the first antenna and the second antenna, and the tunable circuit and the frequency-divisional circuit are connected in series with the first antenna and the second antenna.

4. The multi-antenna system as claimed in claim 3, wherein the tunable circuit is arranged between the first antenna and the frequency-divisional circuit.

5. The multi-antenna system as claimed in claim 1, wherein the frequency-divisional circuit is utilized to receive an external signal and divide the external signal into the signals of the first frequency band and the second frequency band.

6. The multi-antenna system as claimed in claim 5, wherein the frequency-divisional circuit is connected to a feeding point for receiving the external signal.

7. The multi-antenna system as claimed in claim 1, wherein the tunable circuit connects at least one passive electronic device to match impedance of the first antenna.

8. The multi-antenna system as claimed in claim 1, wherein the tunable circuit comprises a switch, a tuner, a varactor and/or a diode.

9. The multi-antenna system as claimed in claim 1, wherein the frequency-divisional circuit comprises a diplexer, a low-pass filter, a high-pass filter and/or a band-pass filter.

10. The multi-antenna system as claimed in claim 1, wherein the frequency-divisional circuit is incorporated with a front end component.

11. A multi-antenna system:
    at least one frequency-divisional circuit, utilized to receive an external signal and divide the external signal into signals of different frequency bands;
    at least two antennas, utilized to respectively implement signals of the frequency bands, wherein harmonics are suppressed by the frequency-divisional circuit,
    wherein the multi-antenna system further comprises at least one tunable circuit, and the tunable circuit is arranged between at least one of the frequency-divisional circuit and at least one of the antennas and is utilized to switch the signals of at least one of the frequency bands.

12. The multi-antenna system as claimed in claim 11, wherein the at least one tunable circuit switches the signals of specific frequency bands among the frequency bands, and frequencies of the specific frequency bands are lower than frequencies of other frequency bands among the frequency bands.

13. The multi-antenna system as claimed in claim 11, wherein a portion of the at least two antennas is directly connected to a portion of the frequency-divisional circuits.

14. The multi-antenna system as claimed in claim 11, wherein the at least one frequency-divisional circuit is connected to a feeding point for receiving the external signal.

15. The multi-antenna system as claimed in claim 14, wherein a portion of the at least two antennas is directly connected to the feeding point.

16. The multi-antenna system as claimed in claim 14, wherein a portion of the at least one tunable circuit is arranged between the feeding point and a portion of the at least two antennas.

17. The multi-antenna system as claimed in claim 11, wherein signals of the different frequency bands are separated in order to provide isolation between the at least two antennas.

18. The multi-antenna system as claimed in claim 11, wherein the at least one tunable circuit and the at least one frequency-divisional circuit are connected in series with the at least one of the antennas.

19. The multi-antenna system as claimed in claim 11, wherein the at least one frequency-divisional circuit is incorporated with a front end component.

20. The multi-antenna system as claimed in claim 11, wherein the tunable circuit further comprise at least one passive electronic device to match impedance of a first antenna of the at least two antennas.

* * * * *